United States Patent
Kyusojin et al.

(10) Patent No.: US 8,441,943 B2
(45) Date of Patent: May 14, 2013

(54) INFORMATION PROCESSING APPARATUS AND METHOD, PROGRAM, AND RECORDING MEDIUM

(75) Inventors: Hiroshi Kyusojin, Tokyo (JP); Satoshi Futenma, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 11/400,286

(22) Filed: Apr. 10, 2006

(65) Prior Publication Data

US 2006/0233116 A1 Oct. 19, 2006

(30) Foreign Application Priority Data

Apr. 19, 2005 (JP) ................ P2005-120550

(51) Int. Cl.
*H04L 43/50* (2006.01)
(52) U.S. Cl.
USPC .................... 370/248; 370/252; 370/503
(58) Field of Classification Search ............ 370/252, 370/503
See application file for complete search history.

(56) References Cited

U.S. PATENT DOCUMENTS

| | | | | |
|---|---|---|---|---|
| 2002/0044528 | A1* | 4/2002 | Pogrebinsky et al. | 370/230 |
| 2003/0072269 | A1* | 4/2003 | Teruhi et al. | 370/252 |
| 2004/0165542 | A1* | 8/2004 | Ido et al. | 370/252 |
| 2004/0199659 | A1* | 10/2004 | Ishikawa et al. | 709/235 |
| 2006/0233116 | A1* | 10/2006 | Kyusojin et al. | 370/252 |

FOREIGN PATENT DOCUMENTS

| | | |
|---|---|---|
| JP | 2002-141933 | 5/2002 |
| JP | 2003-179580 | 6/2003 |

OTHER PUBLICATIONS

Handley, et al, IETF RFC 3448, "TCP Friendly Rate Control (TFRC): Protocol Specification", Jan. 2003.*
IETF RFC 3448, "Requirements for Internet Hosts—Application and Support", Oct. 1989.*
Office Action dated Mar. 4, 2010 issued by the Japanese Patent Office, in corresponding Japanese Patent Application No. JP 2005-120550.

* cited by examiner

*Primary Examiner* — Jianye Wu
(74) *Attorney, Agent, or Firm* — Finnegan, Henderson, Farabow, Garrett & Dunner LLP

(57) ABSTRACT

An information processing apparatus for performing communication with another information processing apparatus via a network includes an instruction section instructing a transmission of a first packet in order to obtain a response from the other information processing apparatus; a first generation section generating a first time stamp containing a time when the first packet generated on the basis of instructions by the instruction section is sent out to the network; a second generation section generating a second time stamp containing a time when a second packet that is transmitted as a response for the first packet from the other information processing apparatus is obtained from the network; and a computation section computing a round trip delay between the information processing apparatus and the other information-processing apparatus on the basis of the first and second generated time stamps.

19 Claims, 15 Drawing Sheets

INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2005-120550 filed in the Japanese Patent Office on Apr. 19, 2005, the entire contents of which are incorporated herein by reference.

BACKGROUND OF THE INVENTION

1. Field of the Invention

The present invention relates to an information processing apparatus, an information processing method, a program, and a recording medium. More particularly, the present invention relates to an information processing apparatus capable of accurately calculating a round trip delay between transmission and receiving terminals in data communication, an information processing method for use therewith, a program for use therewith, and a recording medium for use therewith.

2. Description of the Related Art

In the past, there has been a known information processing system for performing, for example, real time streaming of moving image data from a transmission terminal to a receiving terminal by using packet communication. Along with a recent increase in a network band (a higher speed in a network), Internet streaming using a UDP (User Datagram Protocol) has come to be performed. Unlike a TCP, UDP does not have a scheme for rate control. Therefore, it is expected that a UDP becomes a communication method capable of coexisting with TCP in the Internet by using a scheme for rate control, such as a TFRC (TCP Friendly Rate Control) defined by RFC 3448.

In TCP, a determination is made as to packet loss on the basis of a preset time-out time and a round trip time (RTT) between transmission and receiving terminals, which is measured as packets are transmitted and received. For example, unless an acknowledgement packet from the receiving terminal does not arrive within the set time-out time, it is determined that the packets are discarded, and congestion is avoided by controlling the transmission rate. That is, when streaming of moving image data is to be performed by using the Internet, it is also expected in UDP that the RTT is calculated to perform rate control similarly to TCP.

FIG. 1 illustrates a method for measuring an RTT of the related art. In FIG. 1, a data packet transmitted from a transmission terminal 1 via a network 3 is received by a receiving terminal 2. An acknowledgement-packet corresponding to the data packet received by the receiving terminal 2 is transmitted from the receiving terminal 2 via the network 3 to the transmission terminal 1 and is received by the transmission terminal 1.

The transmission terminal 1 attaches a time stamp to the data packet in an application layer in software or hardware implemented in the transmission terminal 1. Thereafter, after undergoing processing for a transport layer through to a data link layer (TCP/IP MAC (Media Access Control), etc.), which are layers lower than the application layer, the transmission terminal 1 transmits a data packet. Then, an acknowledgement packet that is transmitted from the receiving terminal 2 and that is received by the transmission terminal 1 also undergoes processing for a transport layer through to a data link layer (TCP/IP MAC (Media Access Control), etc.) in a manner reverse to that during transmission and is obtained by the application layer, and the RTT is calculated.

The time at which a time stamp is attached to the data packet in the application layer of the transmission terminal 1 is denoted as time Tts. Times at which the data packet is received in the receiving terminal 2 and at which the acknowledgement packet is transmitted in the receiving terminal 2 are denoted as Trr and Trx, respectively. Furthermore, in the transmission terminal 1, the time at which the acknowledgement packet is obtained by the application layer is denoted as Tc and the times are represented in a time sequence, as shown in FIG. 2. In FIG. 2, the horizontal axis indicates a time axis, and it is assumed that time passes from the upper portion in FIG. 2 toward the lower portion.

Therefore, in the transmission terminal 1, the RTT is calculated as in the following equation:

$$RTT = Tc - Tts$$

If the degree of time spent from when the receiving terminal 2 received the data packet until the acknowledgement packet is transmitted is described in the acknowledgement packet and is sent back, the RTT can be calculated even more accurately as shown in the following equation:

$$RTT = (Tc - Tts) - (Trx - Trr)$$

The RTT calculated in this manner is used for various control in a communication process, such as the above-described transmission rate control. Also, a technology for dynamically changing processing related to error correction, such as ARQ (Automatic Repeat Request) and FEC (Forward Error Collection), on the basis of the RTT, has also been proposed (refer to, for example, Japanese Unexamined Patent Application Publication No. 2003-179580).

SUMMARY OF THE INVENTION

However, in the RTT calculation method of the related art, in the application layer of the transmission terminal 1, a time at which a time stamp is attached to a data packet or a time at which an acknowledgement packet is obtained in the application layer are assumed as a packet transmission time or a packet received time, and an RTT is calculated. Specifically, a time at which a data packet is sent out to a network 3 after undergoing processing for a transport layer through to a data link layer (TCP/IP, MAC, etc.), which are layers lower than the application layer, is a packet transmission time, and a time at which an acknowledgement packet is obtained from the network 3 in the physical layer of the transmission terminal 1 is a packet received time. That is, in the RTT calculation method of the related art, the transmission delay due to processing inside the transmission terminal 1 is not taken into consideration.

In comparison, there has been pressure for reconsidering the method of calculating the RTT as a broadband network have become popular in recent years. That is, in related art, the band (transmission rate) of an inexpensive network, such as the Internet, used by, for example, an individual person, is mainly several tens of Kbps to several hundreds of Kbps. When compared to the transmission delay of the network 3, the time necessary for processing inside the terminal is as small (short) as can be ignored. However, in recent years, use of a band close to 1 Gbps is possible sufficiently inexpensively, and the band that can be used on the network has remarkably increased when compared to the case of the related art. On the other hand, it is difficult to say that the transmission speed (processing speed) inside the transmission apparatus 1 has remarkably increased when compared to the case of the related art.

Furthermore, for example, when a program having a high processing load, such as compression and encoding of image data contained in the application of the transmission terminal 1, is running, the RTT calculation process is delayed, and it is difficult to accurately and timely compute the RTT.

Therefore, it is difficult to say that, when compared to the time necessary for a packet to pass over the network 3, the time at which the packet is transmitted to or is received by the network 3 after undergoing processing for the application layer through to the data link layer is as small (short) as can be ignored. In future, it is necessary to calculate the RTT by also considering the transmission delay in the transmission apparatus 1.

The present invention has been made in view of such circumstances. It is desirable to accurately calculate a round trip delay between the transmission and receiving terminals in data communication.

According to an embodiment of the present invention, there is provided an information processing apparatus for performing communication with another information processing apparatus via a network, the information processing apparatus including: instruction means for instructing a transmission of a first packet in order to obtain a response from the other information processing apparatus; first generation means for generating a first time stamp containing a time when the first packet generated on the basis of instructions by the instruction means is sent out to the network; second generation means for generating a second time stamp containing a time when a second packet that is transmitted as a response for the first packet from the other information processing apparatus is obtained from the network; and computation means for computing a round trip delay between the information processing apparatus and the other information processing apparatus on the basis of the first and second generated time stamps.

According to another embodiment of the present invention, there is provided an information processing method for use with an information processing apparatus for performing communication with another information processing apparatus via a network, the information processing method including the steps of: instructing a transmission of a first packet in order to obtain a response from the other information processing apparatus; generating a first time stamp containing a time when the first packet generated on the basis of instructions in the instruction step is sent out to the network; generating a second time stamp containing a time when a second packet that is transmitted as a response for the first packet from the other information processing apparatus is obtained from the network; and computing a round trip delay between the information processing apparatus and the other information processing apparatus on the basis of the first and second generated time stamps.

According to another embodiment of the present invention, there is provided a computer-executable program for enabling an information processing apparatus for performing communication with another information processing apparatus via a network to perform information processing, the program including the steps of: instructing a transmission of a first packet in order to obtain a response from the other information processing apparatus; generating a first time stamp containing a time when the first packet generated on the basis of instructions in the instruction step is sent out to the network; generating a second time stamp containing a time when a second packet that is transmitted as a response for the first packet from the other information processing apparatus is obtained from the network; and computing a round trip delay between the information processing apparatus and the other information processing apparatus on the basis of the first and second generated time stamps.

According to another embodiment of the present invention, there is provided a recording medium having recorded thereon a computer-executable program for enabling an information processing apparatus for performing communication with another information processing apparatus via a network to perform information processing, the program including the steps of: instructing a transmission of a first packet in order to obtain a response from the other information processing apparatus; generating a first time stamp containing a time when the first packet generated on the basis of instructions in the instruction step is sent out to the network; generating a second time stamp containing a time when a second packet that is transmitted as a response for the first packet from the other information processing apparatus is obtained from the network; and computing a round trip delay between the information processing apparatus and the other information processing apparatus on the basis of the first and second generated time stamps.

In the information processing apparatus and method, and the program according to embodiments of the present invention, a transmission of a first packet to be transmitted to another information processing apparatus in order to obtain a response from the other information processing apparatus is instructed. A first time stamp containing the transmission time of the first packet when the first packet generated on the basis of instructions is sent out to the network is generated. A second time stamp containing the reception time of the second packet when the second packet transmitted from the other information processing apparatus as a response for the first packet is obtained from the network is generated. A round trip delay between the information processing apparatus and the other information processing apparatus is computed on the basis of the first and second generated time stamps.

DESCRIPTION OF THE PREFERRED EMBODIMENTS

Embodiments of the present invention will now be described below with reference to the drawings.

Figure 1:
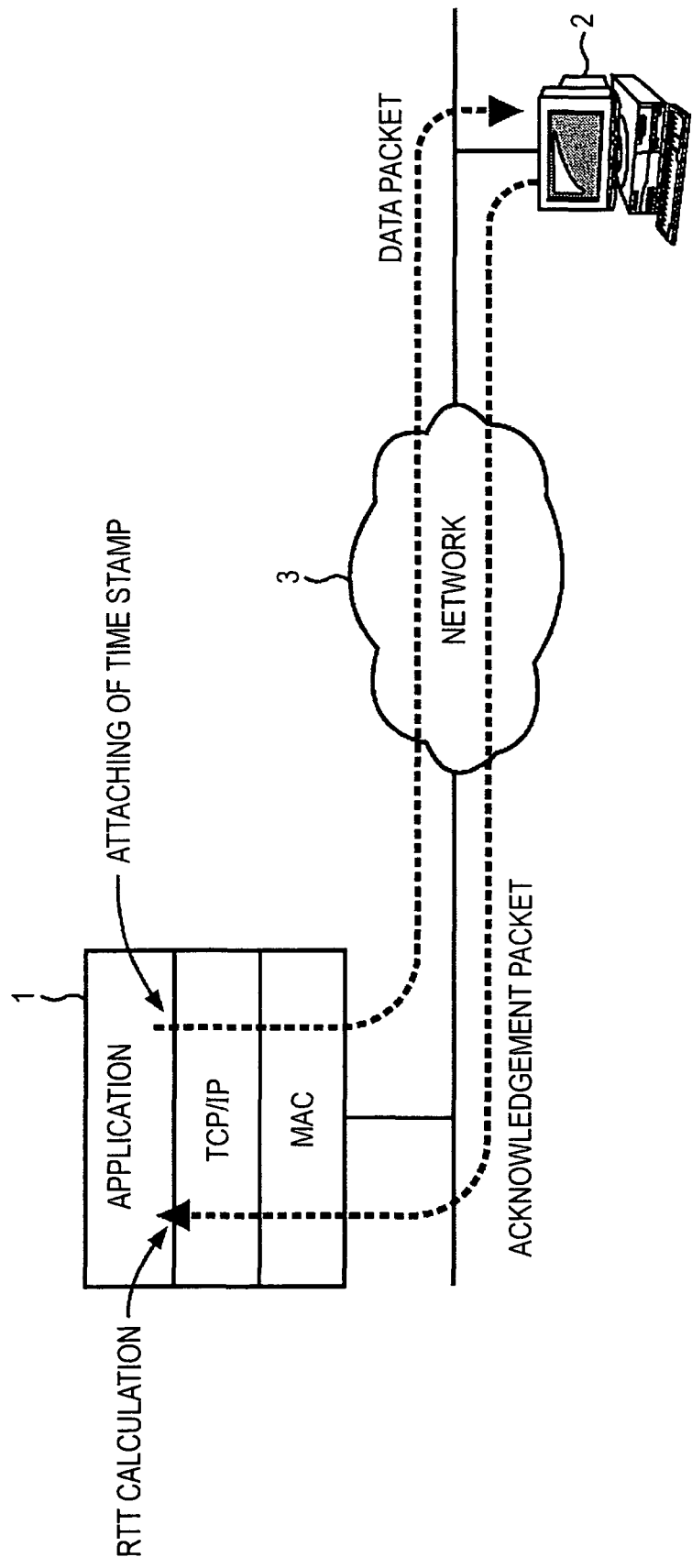
FIG. 1 illustrates an example of a method of calculating an RTT of the related art.
Figure 2:
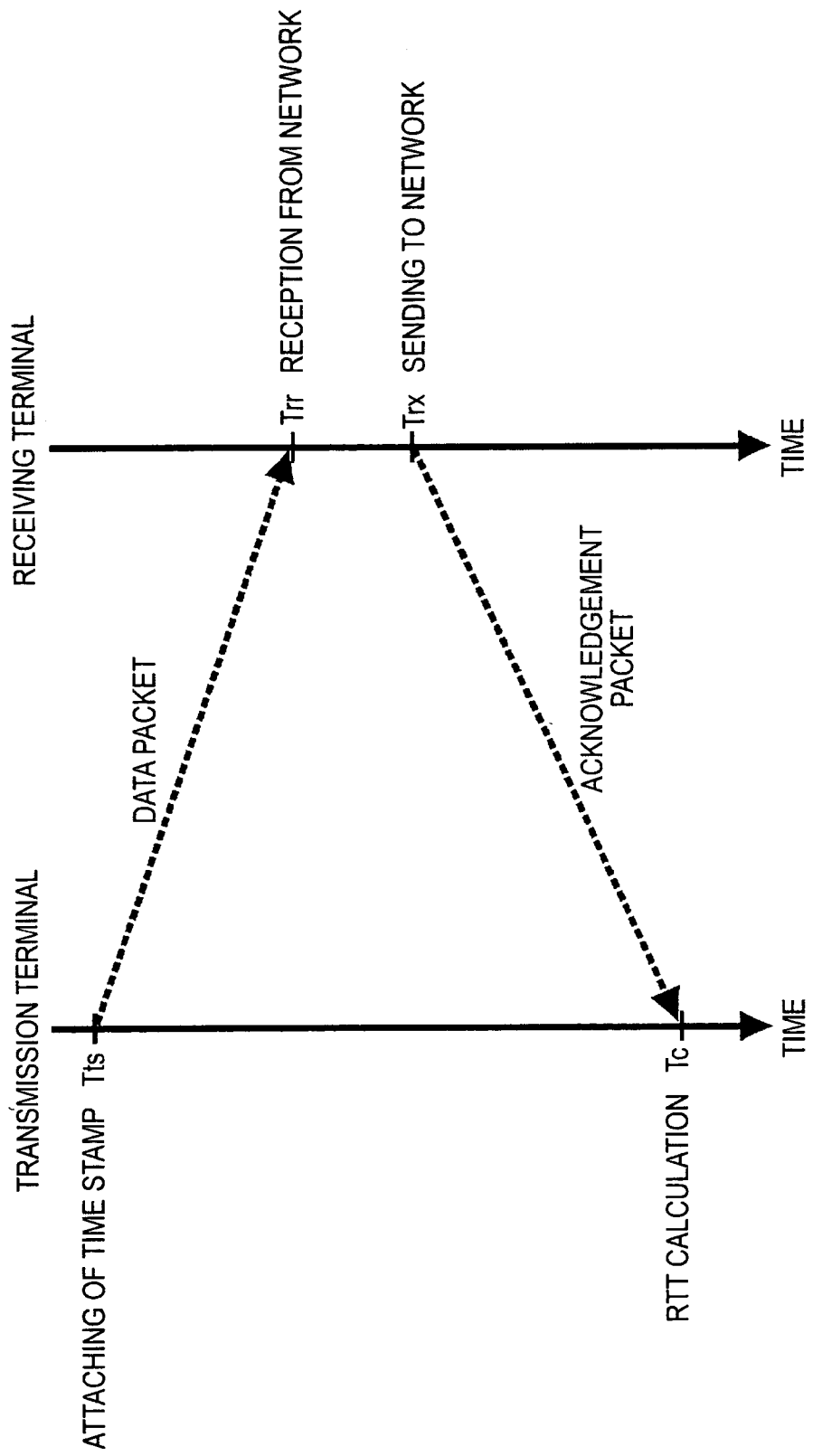
FIG. 2 shows, in a time sequence, times of processing performed in a transmission terminal and a receiving terminal of FIG. 1.
Figure 3:
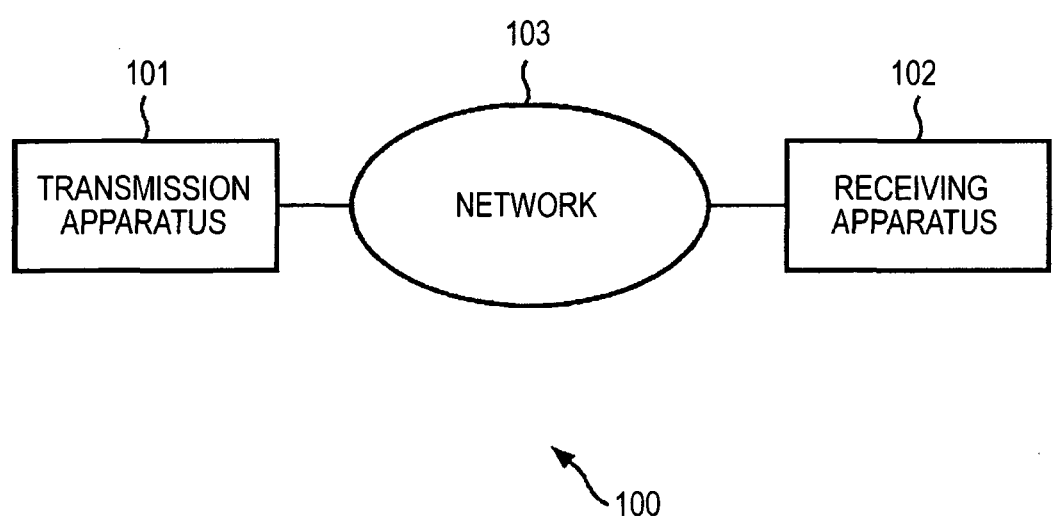
FIG. 3 shows an example of the configuration of a communication system to which an embodiment of the present invention is applied.

FIG. 3 shows an example of the configuration of a communication system to which an embodiment of the present invention is applied.

In FIG. 3, a communication system 100 includes a transmission apparatus 101, a receiving apparatus 102, and a network 103 such as the Internet, and is a system in which the transmission apparatus 101 and the receiving apparatus 102 transmit and receive data via a network 10. For example, the transmission apparatus 101 packetizes data such as a moving image into packets and performs streaming-transmission in the form of data packets. The receiving apparatus 102 receives the data packets and plays back a moving image. Furthermore, the receiving apparatus 102 transmits an acknowledgement packet corresponding to the data packets transmitted by the transmission apparatus 101 to the transmission apparatus 101.

In the acknowledgement packet, information necessary for the calculation of the RTT, such as the time at which the receiving apparatus 102 received the data packet and the time at which the receiving apparatus 102 transmitted the acknowledgement packet, is described. Here, among the packets transmitted from the receiving apparatus 102 to the transmission apparatus 101, the packet that the receiving apparatus 102 sends back as a response with respect to the data packet that is transmitted from the transmission apparatus 101 and is received will be referred to as an "acknowledgement packet".

The transmission apparatus 101 receives the acknowledgement packet transmitted from the receiving apparatus 102 and calculates a round trip time (RTT) between the transmission apparatus 101 and the receiving apparatus 102. Then, the transmission apparatus 101 makes a determination as to packet loss on the basis of the time-out time set on the basis of the RTT. If the acknowledgement packet from the receiving apparatus 102 does not arrive within the set time-out time, it is determined that the packet is discarded, and a process for avoiding congestion is performed by, for example, changing the transmission rate.

Here, if the packet size of the packet transmitted from the transmission apparatus 101 is denoted as s, the RTT as R, the loss rate (0 to 1.0) as p, the time-out time as tRTO, and the transmission rate of the acknowledgement packet (at which units of packets an acknowledgement is sent back) as b, the transmission rate X can be calculated as, for example, equation (1):

$$X = \frac{s}{R \times \sqrt{\frac{2 \times b \times p}{3}} + \left(t\_RTO \times \left(3 \times \sqrt{\frac{3 \times b \times p}{8}} \times p \times (1 + 32 \times p^2)\right)\right)} \quad (1)$$

Among them, the packet size s and the transmission rate b (usually 1 or 2) of the acknowledgement packet are constants, and the tRTO is usually 4×RTT. Therefore, it can be seen that the transmission rate is determined on the basis of the packet loss rate in the network and the RTT.

The transmission apparatus 101 performs a congestion avoidance process, for example, by controlling the transmission rate thereof on the basis of the transmission rate X calculated in the manner described above.

Figure 4:
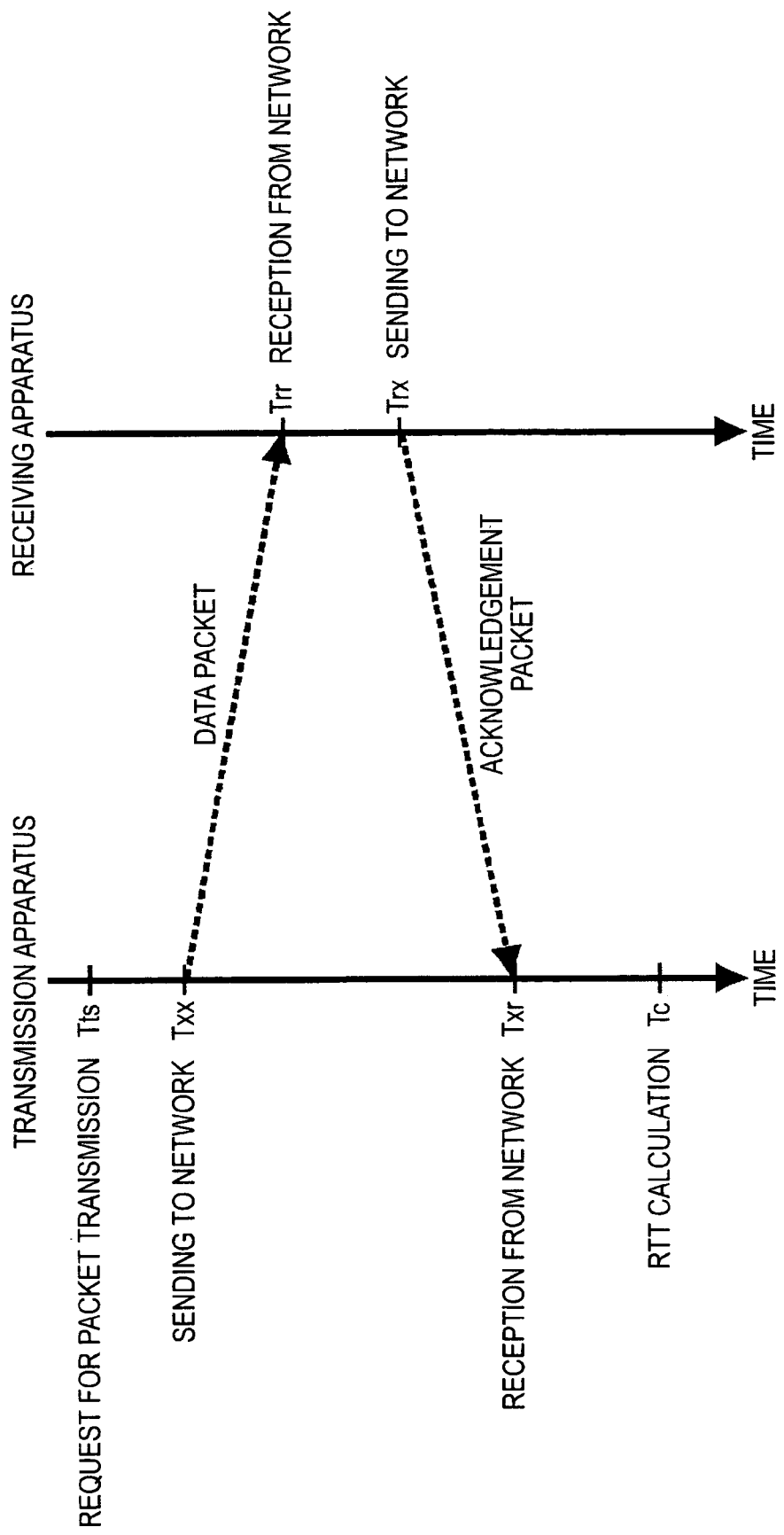
FIG. 4 shows, in a time sequence, times of processing performed in the transmission terminal and the receiving terminal of FIG. 1.

FIG. 4 illustrates processing performed between the transmission apparatus 101 and the receiving apparatus 102 and the passage of time during the above-described calculation of the RTT. In FIG. 4, the horizontal axis is a time axis, in which processing performed between the transmission apparatus 101 and the receiving apparatus 102 is shown together with the time at which the processing is performed. The time is assumed to pass from the upper portion of FIG. 4 toward the lower portion.

At time Tts, the transmission apparatus 101 makes a request for the transmission of a data packet in order to calculate the RTT. At time Txx, the data packet is sent out to the network 103.

At time Trr, the receiving apparatus 102 receives the data packet via the network 103. At time Trx, the receiving apparatus 102 sends out an acknowledgement packet corresponding to the received data packet to the network 103.

Thereafter, at time Trx, the transmission apparatus 101 obtains (receives) the acknowledgement packet transmitted via the network 103. At time Tc, the transmission apparatus 101 starts the calculation of the RTT on the basis of the received acknowledgement packet.

When a narrow band network of the related art is used, in the communication system 100, the time necessary for processing inside the transmission apparatus 101 is as small (short) as can be ignored when compared to the delay that is generated in the network 103.

However, along with recent popularization of a broadband network, the band of the network 103 has become sufficiently wider (has sped up). In order to accurately calculate the RTT, the time necessary for processing inside the transmission apparatus 101 has become incapable of being ignored.

Therefore, in the embodiment of the present invention, the RTT is calculated by considering the time necessary for processing inside the transmission apparatus 101. That is, in related art, the RTT is calculated by making approximations in such a manner that a data packet is transmitted at time Tts without considering the time necessary for processing inside the transmission apparatus 101 and in such a manner that an acknowledgement packet is received at time Tc. However, in the embodiment of the present invention, the RTT is calculated by assuming that a data packet is transmitted at time Txx and an acknowledgement packet is received at time Txr. As a result of the above, a more accurate calculation of the RTT in which the time necessary for processing inside the transmission apparatus 101 is taken into consideration becomes possible.

Figure 5:
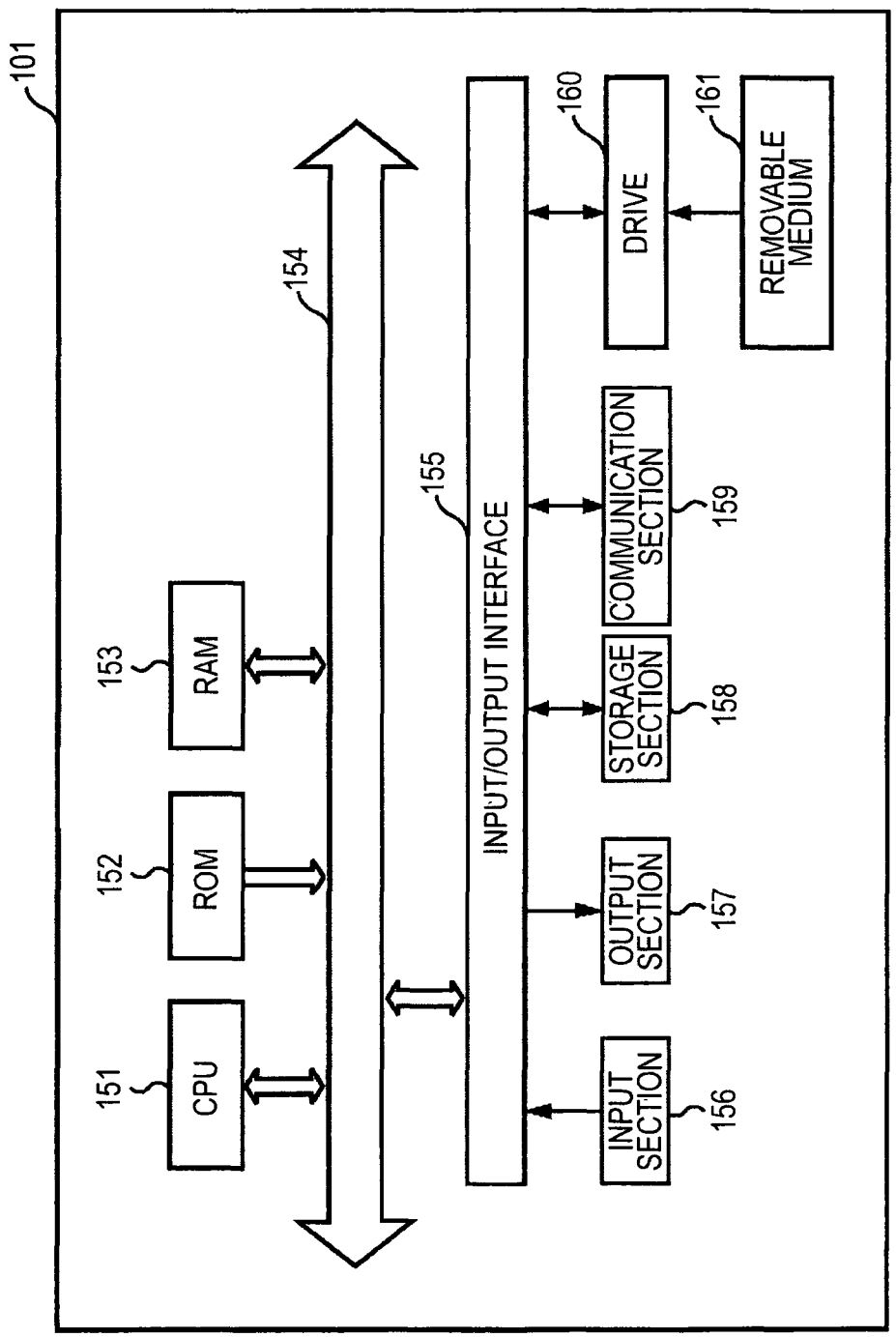
FIG. 5 is a block diagram showing an example of the internal configuration of a transmission apparatus of FIG. 3.

FIG. 5 is a block diagram showing an example of the internal configuration of the transmission apparatus 101. In FIG. 5, a CPU (Central Processing Unit) 151 performs various kinds of processing in accordance with a program stored in a ROM (Read Only Memory) 152 or in accordance with a program loaded from a storage section 158 into a RAM (Random Access Memory) 153. In the RAM 153, data, etc., necessary for the CPU 151 to perform various kinds of processing is stored as appropriate.

The CPU 151, the ROM 152, and the RAM 153 are interconnected with one another via a bus 154. An input/output interface 155 is also connected to the bus 154.

An input section 156 including a keyboard, a mouse or the like; an output section 157 including a display formed of a CRT (Cathode Ray Tube) or an LCD (Liquid Crystal display), a speaker or the like; a storage section 158 including a hard disk or the like; and a communication section 159 including a network interface card such as a modem, a LAN card or the like are connected to the input/output interface 155. The communication section 159 performs a communication process via a network including the Internet.

A drive 160 is also connected to the input/output interface 155 as necessary. A removable medium 161, such as a magnetic disk, an optical disc, a magneto-optical disc, or a semiconductor memory, is loaded thereinto as appropriate. A computer program read therefrom is installed into the storage section 158 as necessary.

Figure 6:
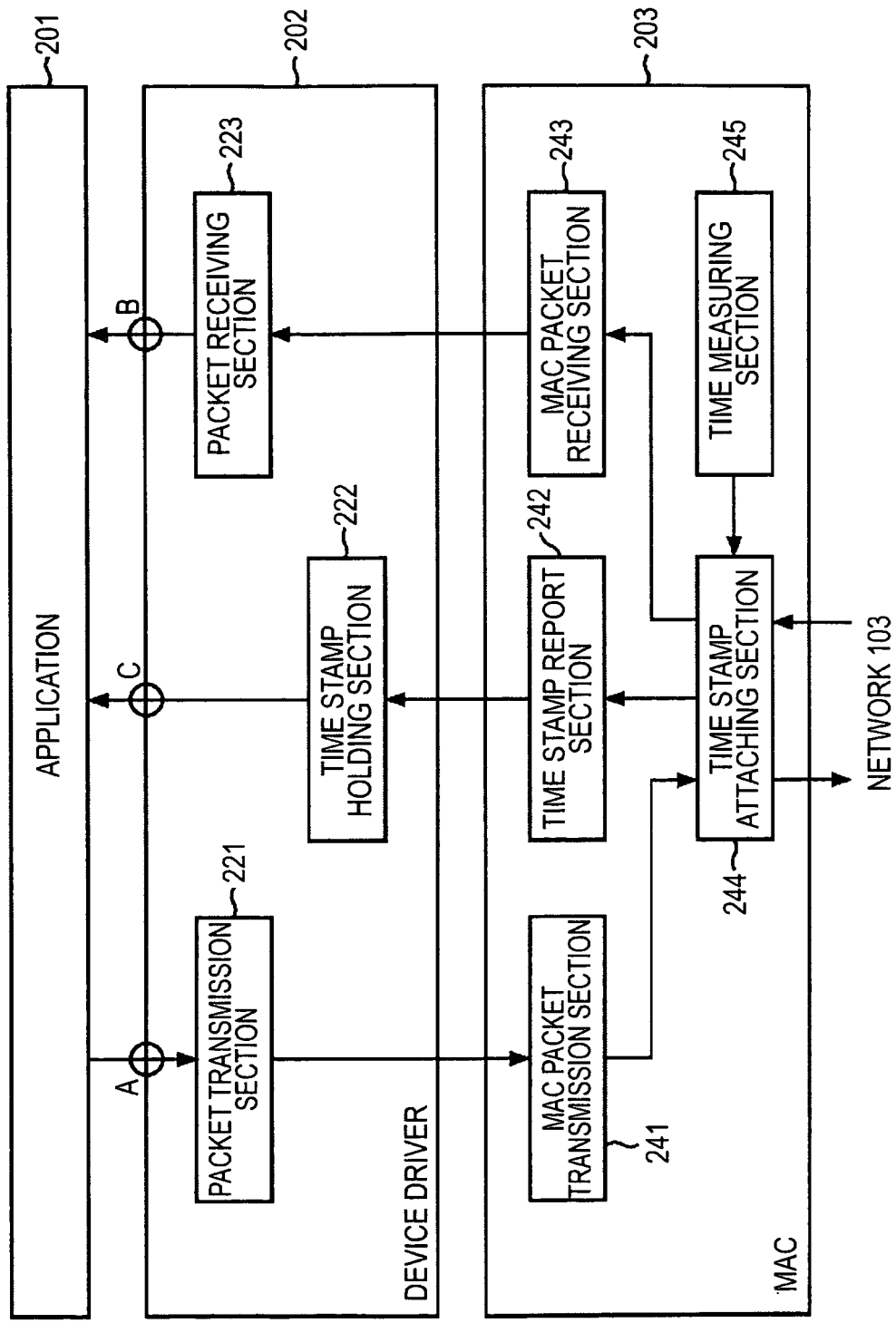
FIG. 6 is a block diagram showing an example of the functional structure of software to be executed by a CPU of FIG. 5.

FIG. 6 is a block diagram showing an example of the functional structure of software to be executed by the CPU 151 of FIG. 5. The "instruction means" according to an embodiment of the present invention can be realized by, for example, the application 201 of FIG. 6; the "first generation means" can be realized by, for example, the time stamp attaching section 244 of FIG. 6; the "second generation means" can be realized by, for example, the time stamp attaching section 244 of FIG. 6; and the "computation means" can be realized by, for example, the application 201 of FIG. 6.

In FIG. 6, the software to be executed by the CPU 151 is formed of three hierarchies: an application 201, a device driver 202, and MAC (Media Access Control).

The application 201 is, for example, a group of programs representing hierarchies, which contain a series of application programs for controlling the transmission and reception of the data to and from the receiving apparatus 102, and controls the calculation of the RTT and the execution of processing necessary for the calculation of the RTT. The application 201 corresponds to each layer of the network layer and higher layers in the OSI reference model.

The device driver 202 is, for example, a group of programs representing hierarchies containing a program for controlling communication devices such as a network interface card corresponding to the communication section 159 of the transmission apparatus 101, and performs processing, such as transmission or reception of packets or provision of a time stamp (to be described later), on the basis of an instruction from the application 201. The device driver 202 corresponds to the data link layer in the OSI reference model.

The MAC 203 represents a hierarchy containing functions blocks of a communication device controlled by the device driver 202. In practice, the MAC 203 may be provided as hardware such as a network interface card. Under the control of the device driver 202, the MAC 203 sends out (transmits) packets to the network 103, obtains (receives) packets from the network 103, and also attaches (generates) a time stamp indicating the transmission time or the received time at which packets are transmitted or received. In the OSI reference model, the MAC 203 corresponds to the data link layer (partly corresponds to the physical layer).

The application 201 is provided in the device driver 202, and performs transmission and reception of data to and from the device driver 202 by using interfaces A to C, which are three interfaces indicated by circles in FIG. 6.

In the application 201, protocol stacks of TCPI/IP, which are formed of a series of programs for performing, for example, generation of packets, confirmation of a delivery, and control of the amount of data for the purpose of performing TCP/IP communication or UDP communication with the receiving apparatus 102. For example, data of a moving image, which is transmitted from the transmission apparatus 101 and which is transmitted to or received from the receiving apparatus 102, is transmitted to or received from the network 103 after undergoing processing by the protocol stacks of TCPI/IP. The series of programs constituting the protocol stacks of TCPI/IP are incorporated into, for example, an OS (Operating System) distributed commonly. In practice, the protocol stacks of TCPI/IP also perform processing related to communication of UDP, but these are referred to as "protocol stacks of TCPI/IP" herein.

The interface A or B is an interface used to transmit and receive data necessary for processing for transmitting or receiving packets to or from the network 103. For example, the interface A or B is constructed in such a manner as to comply with the protocol stacks of TCPI/IP contained in the application 201. That is, the interface A or B is constructed similarly to an interface, such as driver software of a network interface card distributed commonly.

The interface C is an interface used to transmit and receive data necessary for processing for providing a time stamp on the basis of instructions of the application 201. This interface is not used for transmitting or receiving packets to or from the network 103, which is performed after undergoing processing for the protocol stacks of TCPI/IP. Therefore, when the device driver 202 and the MAC 203 are to be implemented in the transmission apparatus 101, the protocol stacks of TCPI/IP contained in the application 201 need not to be changed.

When the RTT is to be calculated, the application 201 outputs an instruction for packet transmission to the packet transmission section 221 via the interface A (time Tts of FIG. 4). The packet transmission section 221 controls the MAC packet transmission section 241 so that a MAC address is attached to generate a data packet and this data packet is sent out to the network 103. At this time, the data packet to be sent out passes through the time stamp attaching section 244. In the time stamp attaching section 244, the present time based on the output value of the time measuring section 245 is obtained, a time stamp indicating the transmission time (time Txx of FIG. 4) is generated, and this time stamp is output to a time stamp report section 242. The time measuring section 245 may measure the present time on the basis of a timer incorporated in the transmission apparatus 101 or may measure the present time on the basis of information from another apparatus, which is obtained via the network 103.

The time stamp report section 242 reports the time stamp indicating the data packet transmission time to the time stamp holding section 222, and the time stamp report holds (stores) it.

Furthermore, an acknowledgement packet transmitted from the receiving apparatus 102 is obtained from the network 103 via the time stamp attaching section 244. The acknowledgement packet is received by the MAC packet receiving section 243 and the packet receiving section 223. At this time, in the time stamp attaching section 244, the present time based on the output value of the time measuring section 245 is obtained, and a time stamp indicating the received time (time Txr of FIG. 4) is generated and output to the time stamp report section 242.

The time stamp report section 242 reports the time stamp indicating the received time of an acknowledgement packet to the time stamp holding section 222, and the time stamp report holding section 222 holds (stores) it.

When the packet receiving section 223 supplies an acknowledgement packet and reports the reception of the acknowledgement packet to the application 201 via the interface B, the application 201 outputs a time stamp obtaining request to the time stamp holding section 222 via the interface C, obtains a time stamp indicating the data packet transmission time and a time stamp indicating the acknowledgement packet received time from the time stamp holding section 222, and calculates the RTT in accordance with, for example, equation (2):

$$RTT=(Txr-Txx)-(Trx-Trr) \qquad (2)$$

Figure 7:
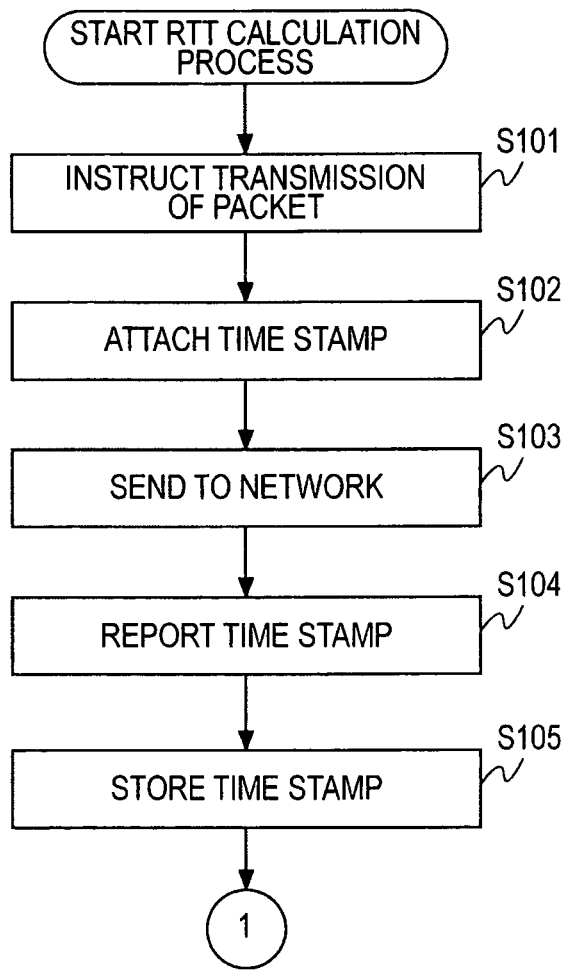
FIG. 7 is a flowchart illustrating an RTT calculation process.

Next, referring to the flowcharts in FIGS. 7 and 8, a description will be given of the RTT calculation process by each section of the transmission apparatus 101 described with reference to FIG. 6. This process may be performed periodically at predetermined intervals and may also be performed on the basis of instructions by a user.

In step S101, the application 201 instructs the packet transmission section 221 to transmit a data packet for calculating the RTT (time Tts of FIG. 4). As a result, the packet transmission section 221 controls the MAC packet transmission section 241 so as to attach a MAC address in order to generate a data packet and output it to the time stamp attaching section 244.

In step S102, the time stamp attaching section 244 obtains the present time on the basis of the output value of the time measuring section 245 and attaches a time stamp. At this time, a time stamp indicating the data packet transmission time (time Txx of FIG. 4) is generated and output to the time stamp report section 242.

In step S103, the time stamp attaching section 244 sends out the data packet to the network 103. Here, the data packet sent out to the network 103 is received by the receiving apparatus 102 (time Trr of FIG. 4). Furthermore, the receiving apparatus 102 transmits an acknowledgement packet corresponding to the received data packet to the transmission apparatus 101 via the network 103 (time Trx of FIG. 4).

In step S104, the time stamp report section 242 reports (outputs) the time stamp that is attached by the process of step S102 to the time stamp holding section 222.

In step S105, the time stamp holding section 222 holds (stores) the time stamp reported by the process of step S104. As a result, in the time stamp holding section 222, the time stamp indicating the data packet transmission time (time Txx of FIG. 4) is stored.

Figure 8:
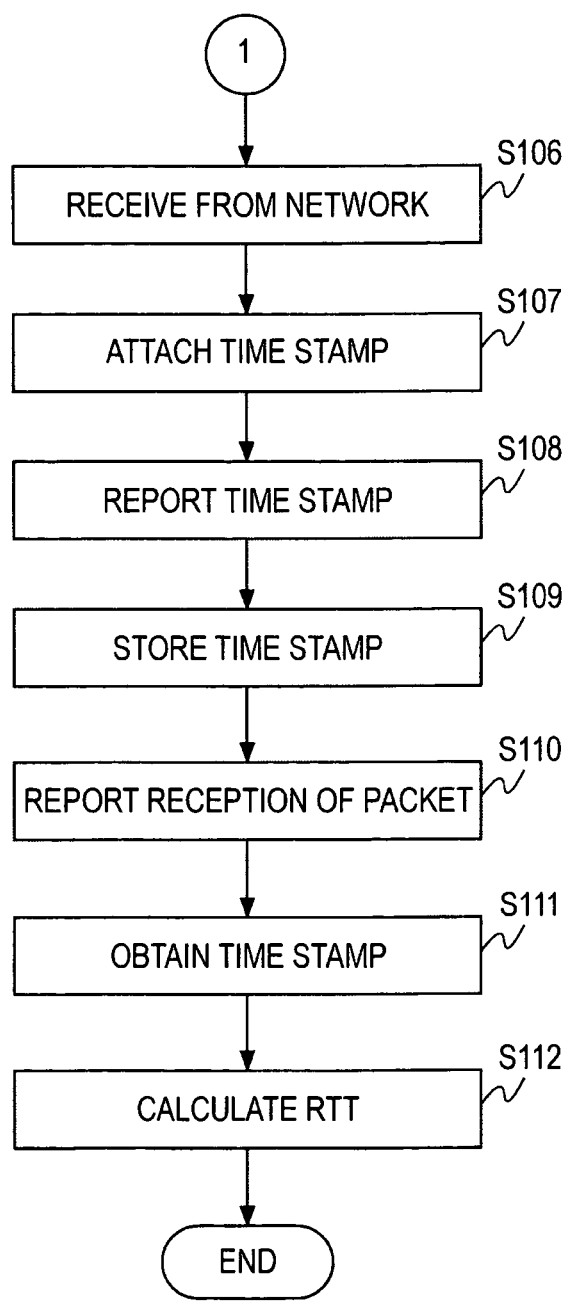
FIG. 8 is a flowchart illustrating an RTT calculation process.

In step S106 of FIG. 8, the time stamp attaching section 244 obtains (receives) the acknowledgement packet transmitted by the receiving apparatus 102 in such a manner as to correspond to the data packet sent out in the process of step S103. As a result, the acknowledgement packet is received by the MAC packet receiving section 243 and the packet receiving section 223.

In step S107, the time stamp attaching section 244 obtains the present time on the basis of the output value of the time measuring section 245 and attaches a time stamp. At this time, a time stamp indicating the acknowledgement packet received time (time Txr of FIG. 4) is generated and output to the time stamp report section 242.

In step S108, the time stamp report section 242 reports (outputs) the time stamp attached by the process of step S107 to the time stamp holding section 222.

In step S109, the time stamp holding section 222 holds (stores) the time stamp reported by the process of step S108. As a result, in the time stamp holding section 222, the time stamp indicating the acknowledgement packet received time (time Txr of FIG. 4) is stored.

In step S110, the packet receiving section 223 supplies the acknowledgement packet to the application 201 so that the reception of the acknowledgement packet is reported.

In step S111, the application 201 obtains a time stamp indicating the data packet transmission time (time Txx of FIG. 4) and a time stamp indicating the acknowledgement packet received time (time Txr of FIG. 4), which are stored in the time stamp holding section 222.

In step S112, the application 112 calculates the RTT in accordance with, for example, equation (2), on the basis of the time stamp obtained by the process of step S111 and the described content of the acknowledgement packet (time Tc of FIG. 4).

The RTT is calculated in the manner as described above. As a result of the above, the RTT can be accurately calculated in such a manner that the difference between time Tts and time Txx of FIG. 4 and the difference between time Txr and time Tc of FIG. 4, which are times necessary for the processing inside the transmission apparatus 101, are not contained.

Furthermore, between the application 201 and the device driver 202, the interface (interface A or B) used to transmit or receive data necessary for processing for transmitting or receiving packets, and the interface (interface C) used to transmit or receive data necessary for providing a time stamp are provided correspondingly. Therefore, it is possible for the user to cope so as to be able to accurately calculate the RTT by only installing, for example, the MAC 203 (network interface card) and the device driver 202 in compliance with it into the transmission apparatus 101 of the related art.

In the foregoing, an example of calculating the RTT by the application 201 has been described. Alternatively, the RTT can also be calculated by the device driver 202.

Figure 9:
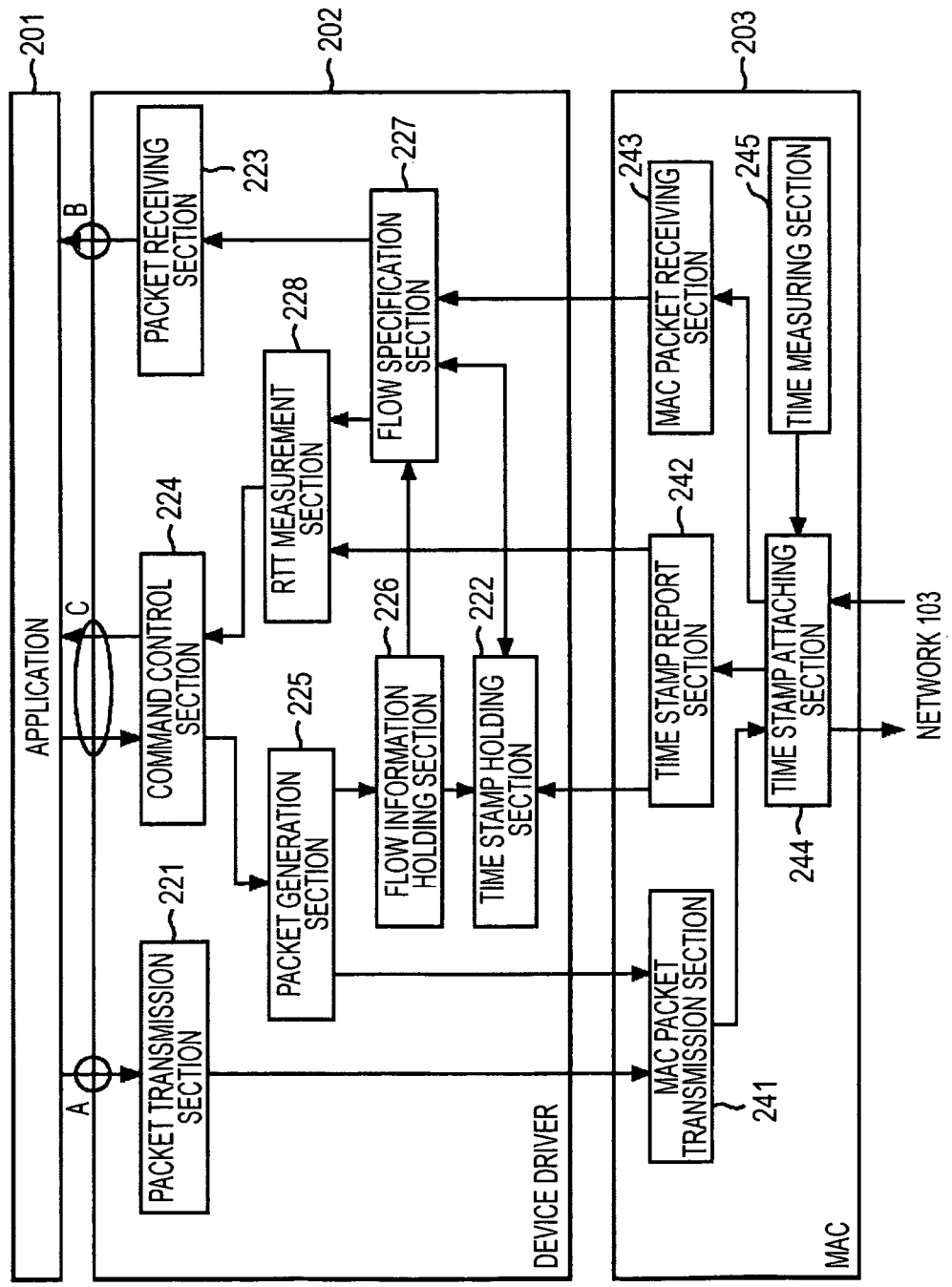
FIG. 9 is a block diagram showing another example of the functional structure of software to be executed by the CPU of FIG. 5.

FIG. 9 is a block diagram showing an example of the functional structure of software to be executed by the CPU 151 of FIG. 5 when the RTT is calculated by the device driver 202. FIG. 9 is a block diagram corresponding to FIG. 6, and components in FIG. 9 corresponding to those in FIG. 6 are designated with the same reference numerals. The "flow information storage means" according to an embodiment of the present invention can be realized by, for example, the flow information holding section 226 of FIG. 9; the "determination means" can be realized by, for example, the flow specification section 227 of FIG. 9; the "execution control means" can be realized by, for example, the application 201 of FIG. 9; and the "interface" can be realized by, for example, the interface A, B, or C of FIG. 9.

In FIG. 9, the configuration of the device driver 202 differs from that of FIG. 6. That is, in the block diagram of FIG. 9, a command control section 224 through to an RTT measurement section 228 are newly provided.

The command control section 224 accepts an instruction for calculating (measuring) the RTT from the application 201 via the interface C, and controls the packet generation section 225 so as to generate a data packet necessary for the calculation of the RTT.

The packet generation section 225 outputs the generated packet to the MAC packet transmission section 241, sends it out to the network 103 via the time stamp attaching section 244, and also outputs the flow information of the generated packet to the flow information holding section 226. Here, the flow information is information for specifying a data packet necessary for the calculation of the RTT, and is, for example, information, such as the destination address (in this case, the address of the receiving terminal 102) of the data packet and the type of data packet (for example, an ICMP (Internet Control Message Protocol) echo request).

Furthermore, the time stamp of the data packet (the transmission time of the data packet) to be sent out is reported from the time stamp report section 242 to the RTT measurement section 228.

On the other hand, the packet transmitted from the receiving apparatus 102, which is received from the network 103, passes through the time stamp attaching section 244 and is supplied from the MAC packet receiving section 243 to the flow specification section 227. The flow specification section 227 checks information, such as the transmission source address (whether or not being the address of the receiving terminal 102) of the packet supplied from the MAC packet receiving section 243 and the type (whether or not being an ICMP echo reply) of packet, and compares it with the flow information registered in the flow information holding section 226.

On the basis of the comparison result, the flow specification section 227 determines whether or not the packet supplied from the MAC packet receiving section 243 is an acknowledgement packet corresponding to the data packet transmitted for the calculation of the RTT. When it is determined that the target packet is an acknowledgement packet corresponding to the data packet transmitted for the calculation of the RTT, the time stamp (the received time of the acknowledgement packet: time Txr of FIG. 4) of the target packet is obtained from the time stamp holding section 222, and is output together with the target packet to the RTT measurement section 228.

The RTT measurement section 228 obtains a time stamp indicating the data packet transmission time and a time stamp indicating the acknowledgement packet received time, calculates the RTT in accordance with, for example, equation (2), and outputs the calculation result to the command control section 224.

The command control section 224 outputs a notification of the completion of the RTT calculation and the calculation result to the application 201 via the interface C.

In the case of the example of FIG. 9, the transmission and reception of data related to communication other than processing for the calculation of the RTT is performed between the application 201 and the device driver 202 via the interface A or B.

Figure 10:
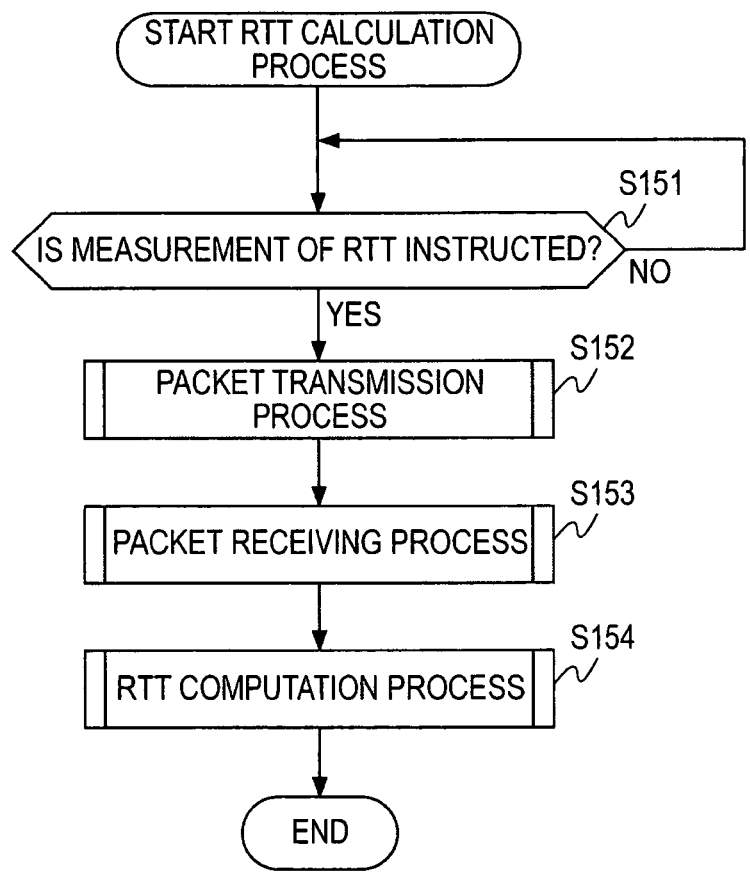
FIG. 10 is a flowchart illustrating another example of an RTT calculation process.

Next, a description will be given, with reference to FIG. 10, of an example of an RTT calculation process corresponding to the block diagram of FIG. 9.

In step S151, the device driver 202 determines whether or not the measurement of the RTT has been instructed from the application 201, and waits until the measurement of the RTT is instructed. When the measurement of the RTT is instructed from the application 201 via the interface C (time Tts of FIG. 4), the process proceeds to step S152.

Figure 11:
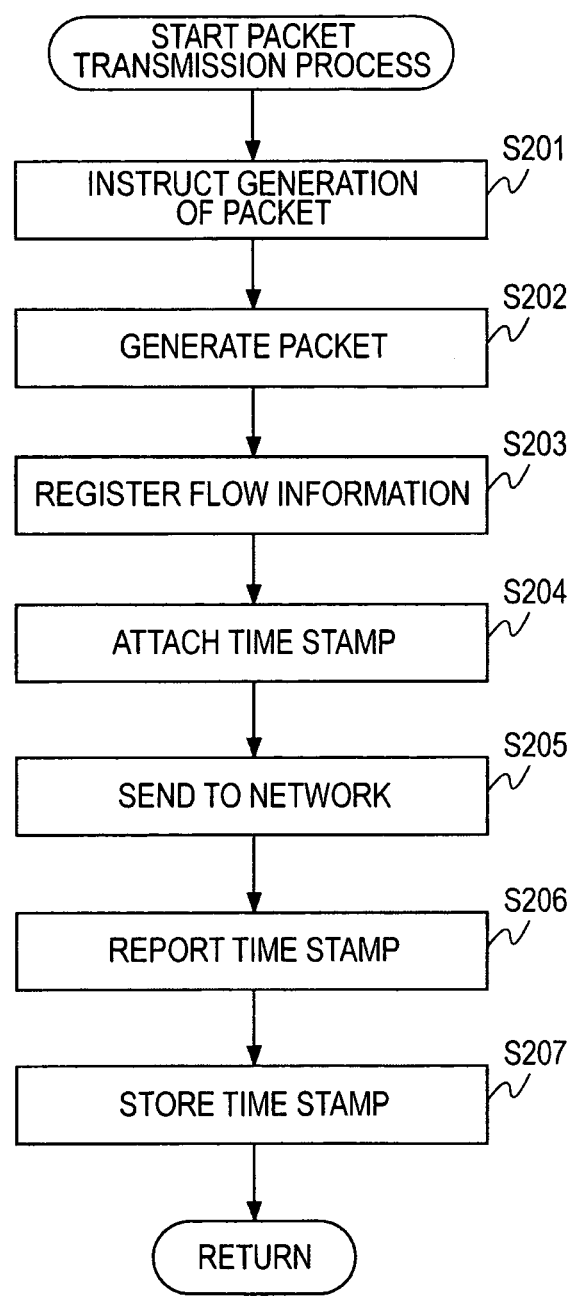
FIG. 11 is a flowchart illustrating an example of a packet transmission process.

In step S152, the device driver 202 performs a packet transmission process (to be described later by referring to FIG. 11). As a result, a data packet for calculating the RTT is transmitted to the receiving apparatus 102.

Figure 12:
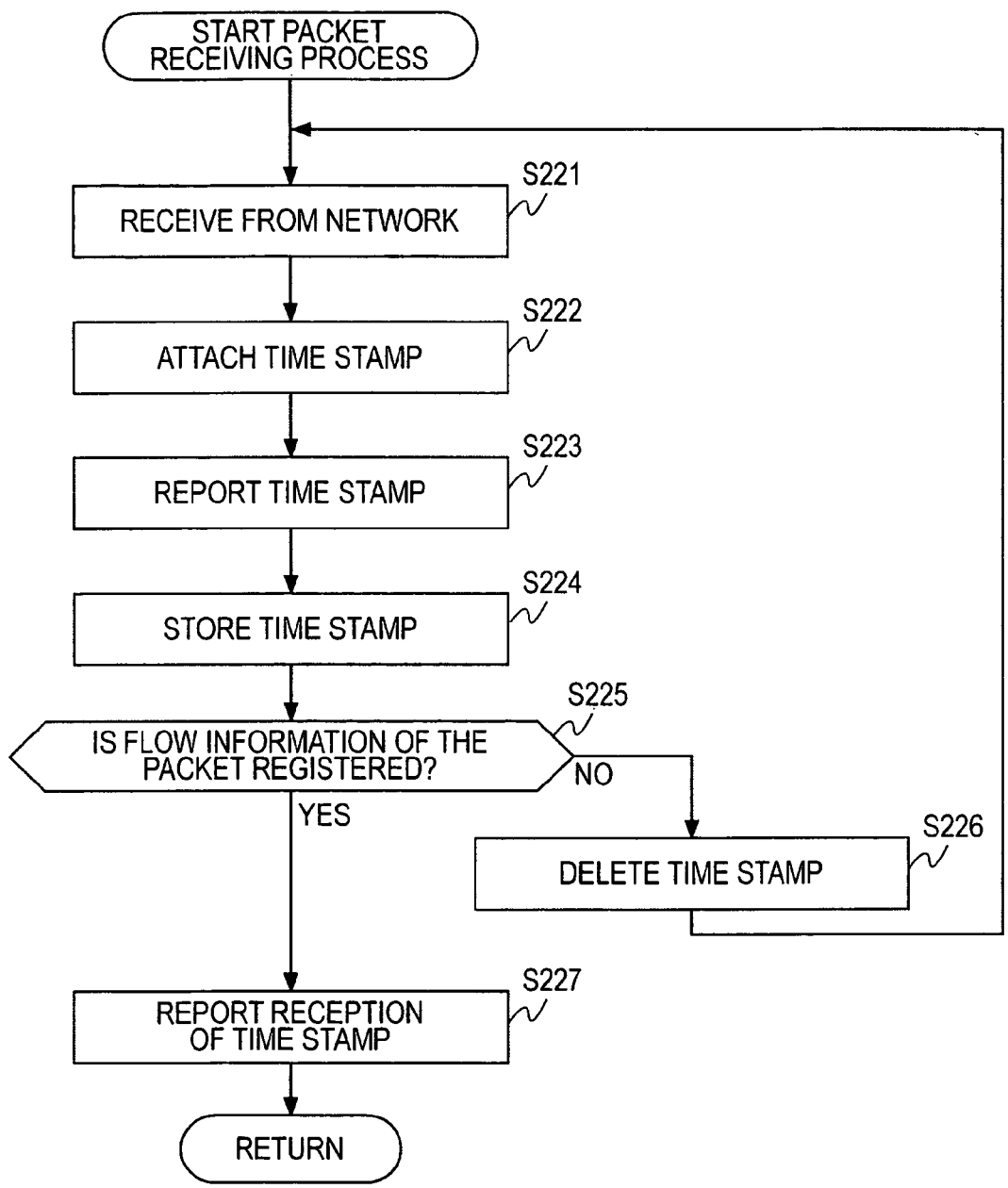
FIG. 12 is a flowchart illustrating an example of a packet receiving process.

After the processing of step S152, in step S153, the device driver 202 performs a packet receiving process (to be described later by referring to FIG. 12). As a result, the acknowledgement packet transmitted by the receiving apparatus 102 is received in such a manner as to correspond to the data packet transmitted in the process of step S152.

Figure 13:
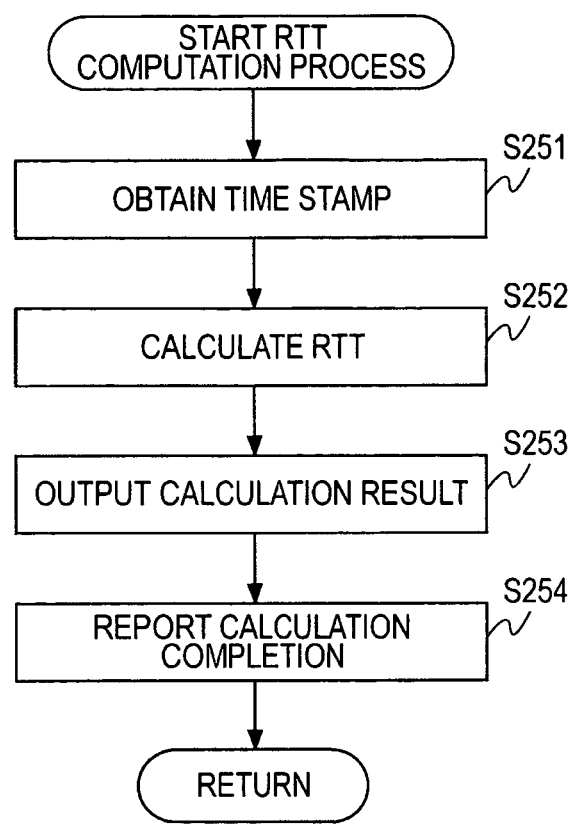
FIG. 13 is a flowchart illustrating an RTT calculation process.

After the processing of step S153, in step S154, the device driver 202 performs an RTT computation process (to be described later by referring to FIG. 13). As a result, the RTT based on the transmission time of the data packet transmitted in the process of step S152 and based on the received time of the acknowledgement packet is calculated, and the calculation result is output to the application 201.

Next, a description will be given, with reference to the flowchart in FIG. 10, of details of the packet transmission process of step S152.

In step S201, the command control section 224 instructs the packet generation section 225 to generate a data packet for calculating the RTT.

In step S202, the packet generation section 225 generates a data packet for calculating the RTT. In this case, a packet of an ICMP echo request, in which the destination is the address of the receiving apparatus 102, is generated. Furthermore, in the MAC packet transmission section 241, a MAC address is attached to the generated data packet, and this data packet is output to the time stamp attaching section 244.

In step S203, the flow information holding section 226 registers (stores) the flow information. As a result, as the flow information of the data packet, information, such as the destination address of the packet and the type of the packet, is stored.

In step S204, the time stamp attaching section 244 obtains the present time on the basis of the output value of the time measuring section 245. At this time, a time stamp indicating the data packet transmission time (time Txx of FIG. 4) is generated and output to the time stamp report section 242.

In step S205, the time stamp attaching section 244 sends out the data packet to the network 103. Here, the data packet sent out to the network 103 is received by the receiving apparatus 102 (time Trr of FIG. 4). Furthermore, the receiving apparatus 102 transmits an acknowledgement packet corresponding to the received data packet to the transmission apparatus 101 via the network 103 (time Trx of FIG. 4).

In step S206, the time stamp report section 242 reports (outputs) the time stamp attached in the process of step S204 to the time stamp holding section 222.

In step S207, the time stamp holding section 222 holds (stores) the time stamp reported in the process of step S206. As a result, the time stamp indicating the data packet transmission time (time Txx of FIG. 4) is stored in the time stamp holding section 222.

The data packet is transmitted in the manner described above.

Next, a description will be given, with reference to the flowchart in FIG. 12, of details of the packet receiving process of step S153 of FIG. 10.

In step S221, the time stamp attaching section 244 obtains (receives) the packet transmitted by the receiving apparatus 102 from the network 103. As a result, the target packet passes through the MAC packet receiving section 243 and is output to the flow specification section 227.

In step S222, the time stamp attaching section 244 obtains the present time on the basis of the output value of the time measuring section 245 and attaches a time stamp. At this time, a time stamp indicating the received time (time serving as a candidate for the time Txr of FIG. 4) of the packet received in the process of step S221 is generated and output to the time stamp report section 242.

In step S223, the time stamp report section 242 reports (outputs) the time stamp attached in the process of step S222 to the time stamp holding section 222.

In step S224, the time stamp holding section 222 holds (stores) the time stamp reported in the process of step S223. At this point in time, since a determination has not yet been made as to the flow information, the target time stamp is stored as a candidate for a time stamp indicating the acknowledgement packet received time in the time stamp holding section 222.

In step S225, the flow specification section 227 determines whether or not the packet received in the process of step S221 is a valid packet, that is, a packet in which the flow information is registered. At this time, the flow specification section 227 checks, for example, the transmission source address and the type of packet, of the packet supplied from the MAC packet receiving section 243, and compares it with the flow information registered in the flow information holding section 226. When the transmission source address of the target packet is an address of the receiving terminal 102 and the type of the target packet is an ICMP echo reply, it is determined that the target packet is a packet in which the flow information is registered. The process then proceeds to step S227.

In step S227, the flow specification section 227 determines the packet received in the process of step S221 as an acknowledgement packet corresponding to the data packet transmitted for the calculation of the RTT, obtains the time stamp (the received time of the acknowledgement packet: time Txr of FIG. 4) of the target packet from the time stamp holding section 222, and outputs it together with the time stamp to the RTT measurement section 228 in order to report the reception of the acknowledgement packet.

On the other hand, when it is determined in step S225 that the target packet is not a packet in which the flow information is registered, the process proceeds to step S226, where the time stamp holding section 222 discards the time stamp of the target packet. Furthermore, in this case, since the target packet (the packet received in the process of step S221) is not an acknowledgement packet corresponding to the data packet transmitted for the calculation of the RTT, the target packet is output to the packet receiving section 223, and the data of the packet is supplied to the application 201 via the interface B.

The acknowledgement packet is received in the manner described above.

Next, a description will be given, with reference to the flowchart in FIG. 13, of details of the RTT computation process of step S154 of FIG. 10.

In step S251, the RTT measurement section 228 obtains a time stamp indicating the transmission time (time Txx of FIG. 4) of the data packet and a time stamp indicating the received time (time Txr of FIG. 4) of the acknowledgement packet.

In step S252, the RTT measurement section 228 calculates the RTT in accordance with, for example, equation (2) on the basis of the time stamp obtained in the process of step S251 and the described content of the acknowledgement packet.

In step S253, the RTT measurement section 228 outputs the calculation result of the RTT by the process of step S252 to the command control section 224.

In step S254, the command control section 224 supplies the calculation result of the RTT output in the process of step S253 to the application 201 and outputs information indicating that the calculation of the RTT is completed to the application 201.

The RTT is computed in this manner. As a result of the above, the RTT can be accurately calculated in such a manner that the difference between the time Tts and the time Txx of FIG. 4, which are times necessary for processing inside the transmission apparatus 101, and the difference between the time Txr and the time Tc, are not contained.

Between the application 201 and the device driver 202, the interface (interface A or B) used for the transmission and reception of the data, which is involved in communication other than processing related to the calculation of the RTT, and the interface (interface C) used for the transmission and reception of the data, which is involved in communication other than processing related to the calculation of the RTT, are provided correspondingly. Therefore, it is possible for the user to cope so as to be able to accurately calculate the RTT by only installing the MAC 203 (network interface card) and the device driver 202 in compliance with it in the transmission apparatus 101 of the related art.

Furthermore, the calculation of the RTT is performed by the device driver 202, and the application 201 may need only to perform processing for instructing the device driver 202 to calculate the RTT and for receiving the supply of the calculated RTT. Therefore, resources of the transmission apparatus 101, such as the CPU and the memory, can be effectively used. For example, resources of the transmission apparatus 101, such as the CPU and the memory, are used much by the program for performing compression and encoding of image data contained in the application 201. Even if the processing load of the transmission apparatus 101 is high, the RTT calculation process is not delayed. As a result, it is possible to accurately and timely compute the RTT.

In the foregoing, an example has been described in which the calculation of the RTT is performed by the transmission-apparatus 101. It is of course possible that the receiving apparatus 102 is configured similarly to the transmission apparatus 101 and the calculation of the RTT is performed by the receiving apparatus 102. The RTT calculated in this manner can be used as an index (reference value) for dynamically changing the processing related to the above-described transmission rate control, ARQ (Automatic Repeat Request), and error correction such as FEC (Forward Error Collection).

The present invention is not limited to the calculation of the RTT. Use of a time stamp indicating the data packet transmission time (time Txx of FIG. 4) and a time stamp indicating the acknowledgement packet received time (time Txr of FIG. 4) enables transmission control to be performed more accurately. For example, the present invention can also be applied to a communication system for predicting congestion of the network and for performing data transmission rate control.

Figure 14:
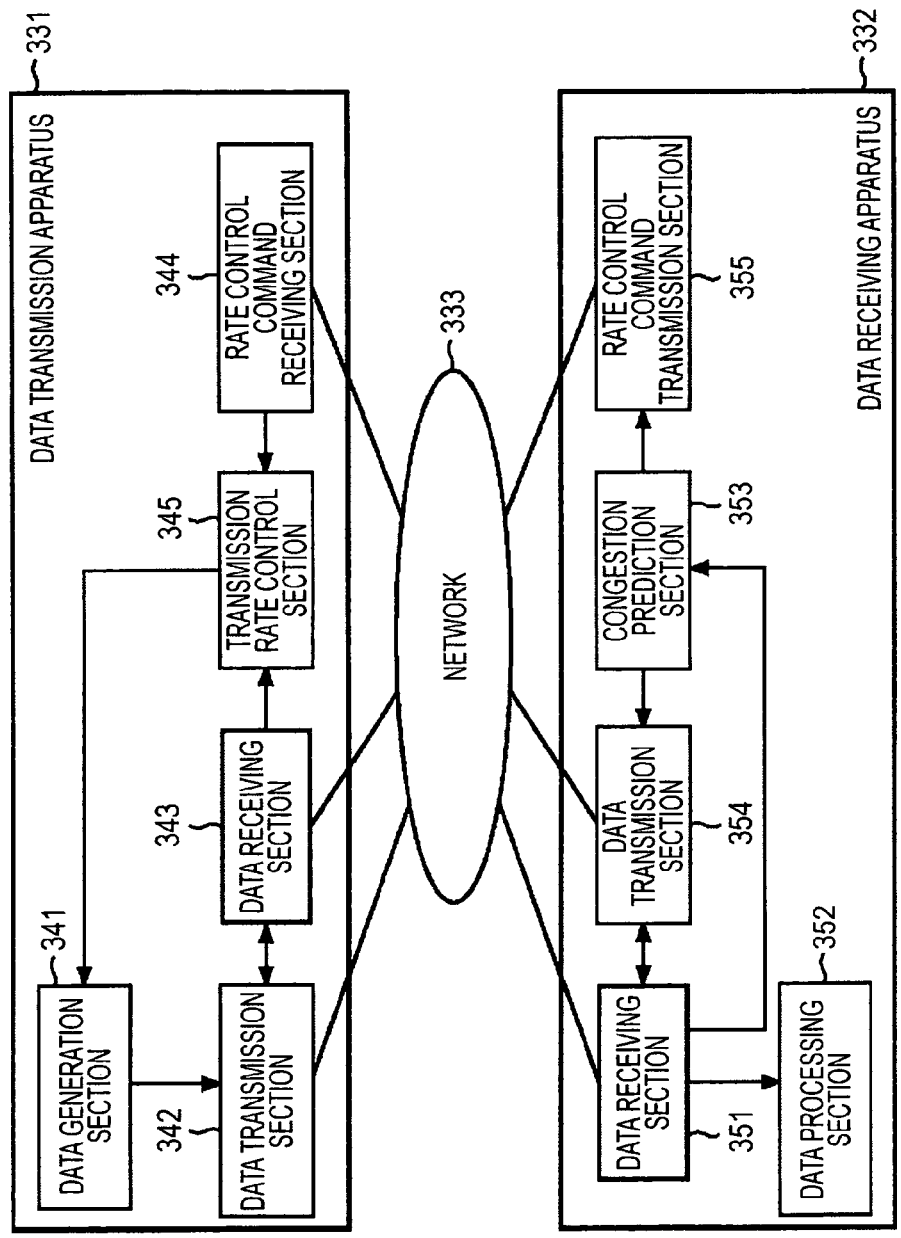
FIG. 14 is a block diagram showing an example of a communication system for performing transmission rate control by estimating congestion of a network.

FIG. 14 is a block diagram showing the configuration of a data transmission apparatus 331 and a data receiving apparatus 332 in another data communication system.

The data transmission apparatus 331 and the data receiving apparatus 332 perform exchange of data in accordance with an RTP (Real-time Transport Protocol), which is a real time data transfer protocol. The RTP is defined with the assumption that it is used in an application for performing a teleconference using video and audio data and with the objective of transferring video and audio data in a form suitable for real time. In the RTP, data is divided into packets in time units and is transmitted. The RTP is a UDP (User Datagram Protocol) type protocol in which countermeasures for packet loss and transmission time guarantee are not performed, and is usually used in a set with a communication status report by an RTCP (RTP Control Protocol).

Furthermore, the network 333 may be, for example, a LAN (Local Area Network) managed within an organization, may be a large-scale network in which an unspecified large number of networks are connected, or may be a dedicated line through which a predetermined transmission apparatus and a predetermined receiving apparatus are connected.

The data generation section 341 of the data transmission apparatus 331 generates, for example, audio, images, video, text data, or data in which these coexist, and supplies it to a data transmission section 342. The amount of data generated at this time is controlled by a transmission rate control section 345.

When the data transmission section 342 transmits the data supplied from the data generation section 341 as RTP packets, the data transmission section 342, attaches an SR (Sender Report) packet of the RTCP at predetermined intervals such as five seconds, and transmits it to the data receiving apparatus 332 via the network 333. The SR packet is a report for transmission and reception statistics on the data transmission side, and information indicating the data transmission status is described.

The SR packet contains an NTP (Network Time Protocol) time stamp and an RTP time stamp.

The data receiving section 343 receives an RR (Receiver Report) packet in the RTCP, which is transmitted from the data receiving apparatus 332. The RR packet is a report for reception statistics from the data reception side.

The rate control command receiving section 344 receives a rate control command from the data receiving apparatus 332 via the network 333 and supplies it to the transmission rate control section 345.

On the basis of the rate control command supplied from the rate control command receiving section 344, the transmission rate control section 345 generates a transmission rate control signal and supplies it to the data generation section 341.

The data receiving section 351 of the data receiving apparatus 332 receives an SR packet and an RTP packet from the data transmission apparatus 331 via the network 333, supplies data, such as video, audio, and text, of the RTP packet, to a data processing section 352, and supplies information necessary for predicting congestion, such as the received time of the RTP packet, the time stamp, the packet size, and the sequence number, to a congestion prediction section 353.

The data processing section 352 performs processing for the data supplied from the data receiving section 351. More specifically, the data processing section 352 performs, for example, a decoding process, a descrambling process, a display process, or an audio playback process on the supplied data.

The data transmission section 354 generates an RR packet with respect to the RTP packet transmitted from the data transmission apparatus 331 and transmits it to a data transmission apparatus 331 via the network 333.

On the basis of the information supplied from the data receiving section 351, the congestion prediction section 353 predicts congestion of the data transmission path. On the basis of the result, the congestion prediction section 353 sets a data reception rate (that is, a data transmission rate of data received by the data receiving apparatus 332), receives a rate control command, and supplies it to a rate control command transmission section 355, as necessary.

The rate control command transmission section 355 transmits the rate control command supplied from the congestion prediction section 353 as an APP (Application defined RTCP packet) of the RTCP to the data transmission apparatus 331 via the network 333. The APP is a packet for expanding the application.

In the communication system in which rate control is performed in this manner, if the time stamp of the RTP packet can be accurately obtained by implementing the above-described MAC (network interface card) 203 and the device driver 202 in compliance with it in the data transmission apparatus 331 or the data receiving apparatus 332 and by considering a transmission delay due to processing inside the data transmission apparatus 331 or the data receiving apparatus 332, it becomes possible to more accurately predict congestion and to perform correct rate control.

Alternatively, it is also possible to increase the accuracy of the measurement of the band of the network by using the present invention.

For example, when streaming of moving image data or the like is performed in real time from a server to a client through the Internet, the moving image data is transferred beyond the capacity of the network unless it is transferred in accordance with the lowest transfer rate in the network from the server to the client (user), and packet loss occurs. Here, a link having a lowest link speed in the network from the server to the client is referred to as a "bottleneck link".

That is, when performing streaming, the server may need to estimate the speed of the bottleneck link. As a method for estimating the speed of the bottleneck link, for example, there is known a technique called a "packet pair".

This packet pair technique is one of band prediction methods of a bottleneck link. For example, as shown in FIG. 15, two packets 1 and 2 of an equal packet size are transferred by so-called back-to-back without any transmission intervals from the transmission side (server) to the receiving side (client), and the band of the bottleneck link is measured on the basis of the transmission delay of the network.

Figure 15:
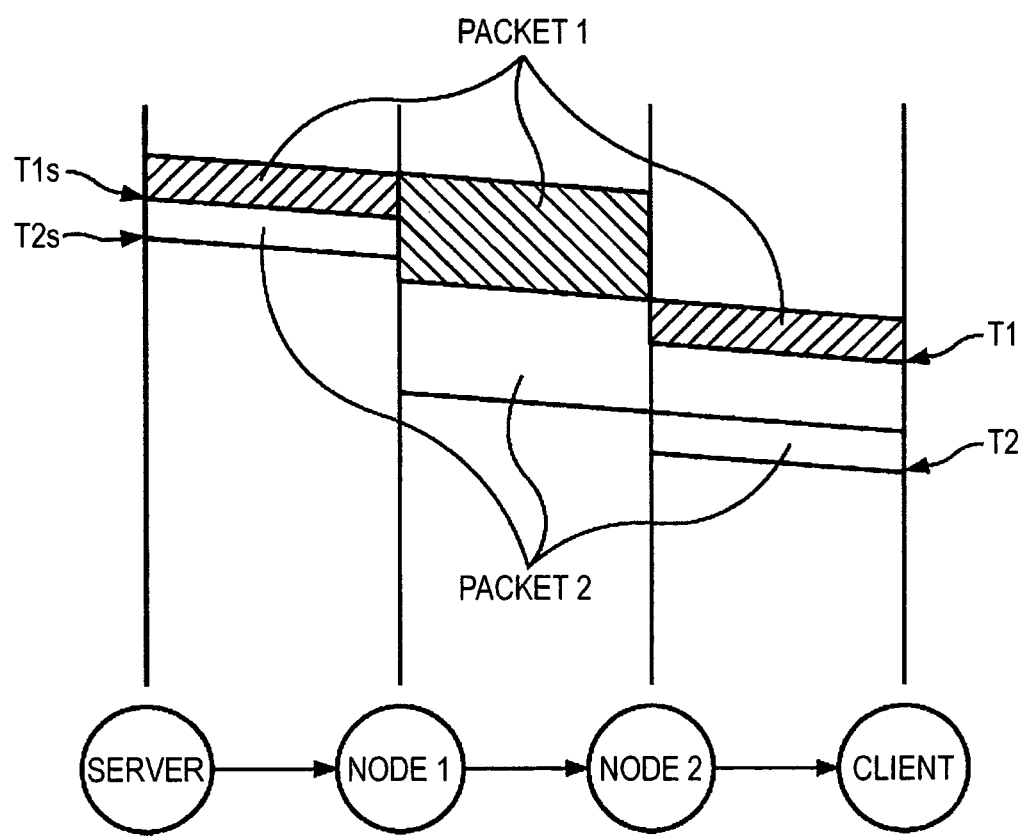
FIG. 15 illustrates a packet pair technique.

In FIG. 15, the horizontal axis indicates time. That is, time T1s indicates a time on the server side where the transfer of the packet 1 is completed, and time T1 indicates a time on the client side where the reception of the packet 1 is completed. Similarly, time T2s indicates a time on the server side where the transfer of the packet 2 is completed, and time T2 indicates a time on the client side where the reception of the packet 2 is completed.

When a pair of packets 1 and 2 such that one of them immediately follows the other is transferred from the server via the nodes 1 and 2, the packets are extended in the time-axis direction between the node 1 and the node 2. The section between the node 1 and the node 2 is a bottleneck link.

By measuring the time T1 of the arrival of the first packet 1 and the time T2 of the arrival of the second packet 2, the client can compute the band B of the bottleneck link in accordance with the following equation:

$$\text{Band } B = S/(T2-T1)$$

where S represents the size of the packet 1 and the packet 2.

In the communication system in which band measurement is performed in this manner, if, for example, the above-described MAC (network interface card) 203 and the device driver 202 in compliance with it are implemented in the client and if the time stamp (arrival time) of the packet 1 and the packet 2 can be accurately obtained by considering a transmission delay due to processing inside the client, band measurement can be performed more accurately.

In the foregoing, an example in which data of a moving image is transmitted and received has been described. However, data to be transmitted and received is not limited to data of a moving image. Furthermore, the network 103 is not limited to a network having cable facilities, such as the Internet, and may be a network realized by a wireless communication technology, such as Bluetooth.

The series of the above-described processes can be performed by hardware, and it can also be performed by software. When the series of the above-described processes is to be performed by software, a program forming the software is installed from a network such as the Internet or from a removable medium (for example, the removable medium 161 of FIG. 5).

The recording medium is formed of the removable medium 161 composed of a magnetic disk (including a floppy disk (registered trademark)), an optical disc (including a CD-ROM (Compact Disk-Read Only Memory) or a DVD (Digital Versatile Disk)), a magneto-optical disc (including an MD (Mini-Disk) (registered trademark)), or a semiconductor memory, in which a program is recorded, the recording medium being distributed to provide the program to the user separately to the main unit of the apparatus. In addition, the recording medium is formed of a ROM in which a program is recorded, a hard disk contained in the storage section, which are provided to the user by being preincorporated into the main unit of the apparatus, etc.

In this specification, steps for performing the series of the above-described processes may be executed chronologically according to the written orders. However, they do not have to be executed chronologically, and may be executed concurrently or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A first information processing apparatus performing communication with a second information processing apparatus through one or more intermediate nodes via a network, the first information processing apparatus comprising:
   a data processor executing an application to prepare a first packet for transmission to the second information processing apparatus;
   means for generating a first time stamp indicating a first packet transmission time at which the first information processing apparatus transmits the first packet is transmitted to the network, the first packet transmission time being subsequent to an ending time of a first time period associated with the preparation of the first packet;
   means for generating a second time stamp indicating a second packet reception time at which a second packet is received from the second processing apparatus over the network;
   means for computing a round trip delay between the first information processing apparatus and the second information processing apparatus on the basis of (i) a difference between the second packet reception time and the first packet transmission time and (ii) a difference between a second packet transmission time and a first packet reception time, the round trip delay excluding the first time period and second period of time associated with a generation and processing of the second packet by the second information processing device; and
   means for calculating a transmission rate based on information associated with the round trip delay, the means for calculating further comprising:
      means for determining a bandwidth of a bottleneck link within the network, based on sizes of the first and third packets, the first packet reception time, and a time at which a third packet is received at the second information processing apparatus, the bottleneck link being disposed between adjacent ones of the intermediate nodes; and
      means for calculating the transmission rate based on at least the bandwidth of the bottleneck link.

2. The first information processing apparatus according to claim 1, further comprising means for storing flow information corresponding to the first packet, the flow information comprising information identifying a type of the first packet and a destination address of the first packet.

3. The first information processing apparatus according to claim 2, further comprising means for comparing information about a transmission source address of a packet obtained from the network and a type of the packet with the stored flow information to determine whether the obtained packet is the second packet.

4. The information processing apparatus according to claim 1, further comprising hierarchical layers including a network layer and a data link layer.

5. The information processing apparatus according to claim 1, further comprising:
   a first interface performing transmission and reception of data to and from the second information processing apparatus; and
   a second interface performing an exchange of data related to the computation of the round trip delay.

6. The first information processing apparatus according to claim 1, wherein the calculated transmission rate reduces congestion of the network.

7. The first information processing apparatus according to claim 1, further comprising:
   means for determining a packet t (S) of the first packet;
   means for setting a time-out time (t_RTO) based on the round trip delay (R);
   means for determining packet loss rate (p) based on the time-out time and the round trip delay;
   means for determining a transmission rate (b) at which the second packet is transmitted from the second information processing apparatus; and
   means for calculating a transmission rate (X) for transmission of a fourth packet from the first information processing apparatus, the calculation being performed by using the equation:

$$X = \frac{S}{R \times \sqrt{\frac{2 \times b \times p}{3}} + \left(t\_RTO \times \left(3 \times \sqrt{\frac{3 \times b \times p}{8}} \times p \times (1 + (32 \times p^2))\right)\right)}.$$

8. The first information processing apparatus of claim 1, wherein the second time stamp is deleted when the second packet is not a valid packet.

9. The apparatus of claim 1, further comprising:
   means for registering flow information corresponding to the first packet, the flow information comprising information identifying a type of the first packet and a destination address of the first packet; and
   means for determining whether the second packet is a valid packet, based on at least the registered flow information associated with the first packet,
   wherein the means for computing comprises means for computing the round trip delay based on at least the first and second time stamps, when the second packet is a valid packet.

10. The apparatus of claim 1, wherein:
    the second information processing apparatus receives the first packet at the first packet reception time; and
    the second information processing apparatus transmits the second packet transmitted to the network at the second packet transmission time.

11. The apparatus of claim 10, wherein:
    the first packet transmission time corresponds to Txx;
    the second packet reception time corresponds to Txr;

the first packet reception time corresponds to Trr;
the second packet transmission time corresponds to Trx;
the round trip delay corresponds to RTT; and
the means for computing is configured to compute the round trip delay in accordance with:

$$RTT=(Txr-Txx)-(Trx-Trr).$$

12. An information processing method for controlling communication between a first information processing apparatus and a second information processing apparatus, the communication being performed via a network through one or more intermediate nodes, the information processing method being executed by the first information processing apparatus and comprising:
  generating an instruction to prepare a first packet for transmission to the second information processing apparatus:
  generating a first time stamp indicating a first packet transmission time at which the first information processing apparatus transmits the first packet to the network, the first packet transmission time being subsequent to an ending time of a first time period associated with the preparation of the first packet;
  generating a second time stamp indicating a second packet reception time at which a second packet is received from the second processing apparatus over the network;
  computing a round trip delay between the first information processing apparatus and the second information processing apparatus on the basis of (i) a difference between the second packet reception time and the first packet transmission time and (ii) a difference between a second packet transmission time and a first packet reception time, the round trip delay excluding the first time period and a second period of time associated with a generation and processing of the second packet by the second information processing device; and
  calculating a transmission rate based on information associated with the round trip delay, the calculating comprising:
    determining a bandwidth of a bottleneck link within the network, based on sizes of the first and third packets, the first packet reception time, and a time at which the a third packet is received at the second information processing apparatus, the bottleneck link being disposed between adjacent ones of the intermediate nodes; and; and
  calculating the transmission rate based on at least the bandwidth of the bottleneck link.

13. The information processing method according to claim 12, wherein the calculated transmission rate reduces congestion of the network.

14. The information processing method according to claim 12, further comprising:
  determining a packet size (S) of the first packet;
  setting a time-out time (t_RTO) based on the round trip delay (R);
  determining packet loss rate (p) based on the time-out time and the round trip delay;
  determining a transmission rate (b) at which the second packet is transmitted from the second information processing apparatus; and
  calculating a transmission rate (X) for transmission of a fourth packet from the first information processing apparatus, the calculation being performed by using the equation:

$$X = \frac{S}{R \times \sqrt{\frac{2 \times b \times p}{3}} + \left(t\_RTO \times \left(3 \times \sqrt{\frac{3 \times b \times p}{8}} \times p \times (1 + (32 \times p^2))\right)\right)}.$$

15. The method of claim 12, further comprising deleting the second time stamp when the second packet is not a valid packet.

16. A non-transitory computer-readable storage medium, storing a program which, when executed on a first information processing apparatus, causes the first information processing apparatus to perform a method of controlling communication with a second information processing apparatus via a network through one or more intermediate nodes, the method comprising:
  generating an instruction to prepare a first packet the second information processing apparatus;
  generating a first time stamp indicating a first packet transmission time at which the first information processing apparatus transmits the first packet to the network, the first packet transmission time being subsequent to an ending time of a first time period associated with the preparation of the first packet;
  generating a second time stamp indicating a second packet reception time at which a second packet is received from the second processing apparatus over the network;
  computing a round trip delay between the first information processing apparatus and the second information processing apparatus on the basis of (i) a difference between the second packet reception time and the first packet transmission time and (ii) a difference between a second packet transmission time and a first packet reception time, the round trip delay excluding the first time period and a second period of time associated with a generation and processing of the second packet by the second information processing device; and
  calculating a transmission rate based on information associated with the round trip delay, the calculating comprising:
    determining a bandwidth of a bottleneck link within the network, based on sizes of the first and third packets, the first packet reception time, and a time at which the a third packet is received at the second information processing apparatus, the bottleneck link being disposed between adjacent ones of the intermediate nodes; and
  calculating the transmission rate based on at least the bandwidth of the bottleneck link.

17. The non-transitory computer-readable storage medium according to claim 16, wherein the calculated transmission rate reduces congestion of the network.

18. The non-transitory computer-readable storage medium according to claim 16, wherein the method further comprises:
  determining a packet size (S) of the first packet;
  setting a time-out time (t_RTO) based on the round trip delay (R);
  determining packet loss rate (p) based on the time-out time and the round trip delay;
  determining a transmission rate (b) at which the second packet is transmitted from the second information processing apparatus; and
  calculating a transmission rate (X) for transmission of a fourth from the first information processing apparatus, the calculation being performed by using the equation:

$$X = \frac{S}{R \times \sqrt{\frac{2 \times b \times p}{3} + \left(t\_RTO \times \left(3 \times \sqrt{\frac{3 \times b \times p}{8}} \times p \times (1 + (32 \times p^2))\right)\right)}}.$$

19. A first information processing apparatus performing communication with a second information processing apparatus via a network through one or more intermediate nodes, the first information processing apparatus comprising:
    a data processor executing an application to prepare a first packet for transmission to the second information processing apparatus;
    a first generation section generating a first time stamp indicating a first packet transmission time at which the first information processing apparatus transmits the first packet to the network, the first packet transmission time being subsequent to an ending time of a first time period associated with the preparation of the first packet;
    a second generation section generating a second time stamp indicating a second packet reception time at which a second packet is received from the second processing apparatus over the network;
    a computation section computing a round trip delay between the first information processing apparatus and the second information processing apparatus on the basis of (i) a difference between the second packet reception time and the first packet transmission time and (ii) a difference between a second packet transmission time and a first packet reception time, the round trip delay excluding the first time period and a second period of time associated with a generation and processing of the second packet by the second information processing device; and
    a section for calculating a transmission rate based on information associated with the round trip delay, the calculating section being configured to:
        determine a time at which a third packet is received at the second information processing apparatus;
        determine a bandwidth of a bottleneck link within the network, based on sizes of the first and third packets, the first packet reception time, and a time at which the third packet is received at the second information processing apparatus, the bottleneck link being disposed between adjacent ones of the intermediate nodes; and
        calculate the transmission rate based on at least the bandwidth of the bottleneck link.

\* \* \* \* \*